United States Patent [19]

Fujita et al.

[11] Patent Number: 4,634,687
[45] Date of Patent: Jan. 6, 1987

[54] PROCESS FOR POLYMERIZATION OF OLEFINS

[75] Inventors: Masahito Fujita; Masami Kizaki; Makoto Miyazaki; Naomi Inaba, all of Saitama, Japan

[73] Assignee: Toa Nenryo Kogyo Kabushiki Kaisha, Tokyo, Japan

[21] Appl. No.: 811,556

[22] Filed: Dec. 19, 1985

Related U.S. Application Data

[63] Continuation of Ser. No. 647,766, Sep. 6, 1984, abandoned.

[30] Foreign Application Priority Data

Sep. 22, 1983 [JP] Japan ................... 58-174299

[51] Int. Cl.$^4$ ................... C08F 4/64
[52] U.S. Cl. ................... 502/121; 502/122; 502/123; 502/124; 502/125; 502/126; 502/127; 526/139; 526/140; 526/141; 526/142
[58] Field of Search ............ 502/121, 122, 123, 124, 502/125, 126, 127

[56] References Cited

U.S. PATENT DOCUMENTS

| | | | |
|---|---|---|---|
| 3,549,717 | 12/1970 | Itakura et al. | 502/123 X |
| 4,234,710 | 11/1980 | Moberly et al. | 502/123 X |
| 4,279,776 | 7/1981 | Shiga et al. | 502/123 X |
| 4,312,784 | 1/1982 | Welch | 502/127 X |
| 4,321,345 | 3/1982 | Sato et al. | 502/127 X |
| 4,324,690 | 4/1982 | Karayannis et al. | 502/123 X |
| 4,335,015 | 6/1982 | Imai et al. | 502/123 X |
| 4,442,225 | 4/1984 | Takitani et al. | 502/127 X |

FOREIGN PATENT DOCUMENTS 86644 8/1983 European Pat. Off. .

OTHER PUBLICATIONS

"Effects of Hindered Amines on Supported Catalysts for Polypropyline", Tanger et al., 421–434, presented at a meeting in 1981 and published in *Transition Metal Catalyzed Polymerizations*, R. P. Quirk, Harwood Academic Publishers, 1983.

*Primary Examiner*—Patrick P. Garvin
*Attorney, Agent, or Firm*—M. B. Kurtzman

[57] ABSTRACT

A cocatalyst employed with a titanium-containing catalyst, said titanium-containing catalyst comprising titanium atoms, halogen atoms, and an electron donor compound, said cocatalyst comprising (a) an organoaluminum compound represented by the formula $R^1R^2R^3$ (wherein $R^1$, $R^2$, and $R^3$, which may be the same or different, each denote a $C_{1-20}$ alkyl, alkenyl, cycloalkyl, aryl, aralkyl, or alkoxy group, or a hydrogen atom;

(b) an organoaluminum compound represented by the formula $R_{3-n}^4AlX_n$ (wherein $R^4$ denotes a $C_{1-20}$ alkyl, alkenyl, cycloalkyl, aryl, aralkyl, or alkoxy group; X denotes a halogen atom; and $n \geq 1$), (c) an electron donor compound containing a nitrogen atom, sulfur atom, oxygen atom, or phosphorus atom, and (d) an aromatic carboxylic acid ester.

The catalyst is useful for the polymerization of olefins.

24 Claims, No Drawings

PROCESS FOR POLYMERIZATION OF OLEFINS

This is a continuation of application Ser. No. 647,766 filed Sept. 6, 1984 and now abandoned.

FIELD OF TECHNOLOGY

The present invention relates to a new class of cocatalysts particularly useful in combination with transition metal containing olefin polymerization catalysts, the catalyst systems comprising the new cocatalysts and the process for polymerization of olefins in the presence of the catalyst system comprising the new cocatalyst.

BACKGROUND TECHNOLOGY

Heretofore, many attempts have been made to develop catalyst components for polymerization of olefins which exhibit a high catalytic activity in the production of polyolefins such as polypropylene having a high stereoregularity. Recently, there are known many solid catalyst components improved in catalytic performance. They are produced by contacting a compound of a transition metal belonging to Groups IVb to VIII of the Periodic Table of the elements with a variety of compounds which function as the carrier.

The performance of a polymerization catalyst is greatly affected by a cocatalyst with which the solid catalyst component is combined. Heretofore, the common cocatalyst has been a combination of an organoaluminum compound and an organic acid ester.

In order to maximize catalytic performance, researches have been made on cocatalysts to some extent. For example, it has been disclosed that organic acid esters may be replaced by an electron donor compound containing a hetero atom. Such an electron donor compound is exemplified by nitrogen-containing compounds (e.g., piperidine, pyridine, and nicotinic ester), sulfur-containing compounds (e.g., thiophenic ester), and phosphorus-containing compounds (e.g., phosphites and phosphates). It is also disclosed that a trialkyl aluminum compound and a halogen-containing organoaluminum compound may be used in combination with each other as the organoaluminum compound.

However, the improvements in catalytic performance achieved by the above-mentioned methods are not so significant as those achieved with commonly used cocatalysts composed of a trialkyl aluminum and an organic acid ester. An electron donor compound containing a hetero atom tends to decrease the catalytic activity or the stereoregularity of catalyst.

There is disclosed in Japanese Patent Laid-open No. 139511/1981 a new catalyst in which a solid catalyst component is combined with a cocatalyst composed of a trialkyl aluminum and a hindered Lewis base and an unhindered Lewis base. It has been found that this catalyst exhibits a high catalytic activity and high stereoregularity; but it does not completely outperform the conventional catalyst incorporated with a cocatalyst.

SUMMARY OF THE INVENTION

It is an object of this invention to provide a new catalyst useful in combination with a transitional metal containing olefin polymerization catalyst and the catalyst system comprising the new cocatalyst and the transition metal catalyst to obtain a catalyst system which exhibits high catalytic activity and high stereoregularity so as to be useful in a process for polymerizing olefins. As the result of extensive studies, the present inventors found that the object of this invention can be achieved by using a solid catalyst component composed of different organoaluminum compounds, a compound containing a hetero atom, and an aromatic ester compound. The present invention was completed based on this finding.

The essence of this invention resides in a cocatalyst comprising:

(a) an organo aluminum compound represented by the formula $R^1R^2R^3Al$ wherein $R^1$, $R^2$ and $R^3$, which may be the same or different, each denote a $C_{1-20}$ alkyl, alkenyl, cycloalkyl, aryl, aralkyl, or alkoxy group, or a hydrogen atom, (b) an organo aluminum compound represented by the formula $R^4{}_{3-n}AlX_n$ wherein $R^4$ denotes a $C_{1-20}$ alkyl, alkenyl, cycloalkyl, aryl, aralkyl, or alkoxy group, X denotes a halogen atom, and $N \geq 1$, (c) an electron donor compound containing a nitrogen atom, sulfur atom, oxygen atom or phosphorus atom, and (d) an aromatic ester.

In a second aspect of the invention a catalyst system is provided comprising a cocatalyst described above and a solid catalyst component comprising magnesium atoms, a transition metal such as titanium atoms, halogen atoms and an electron donor compound.

In yet another aspect of the invention there is provided for the homopolymerization of an olefin or copolymerization of an olefin with another olefin in the presence of the catalyst system.

CATALYST COMPONENT

The solid catalyst component [referred to as component (a) hereinafter] used in this invention contains magnesium atoms, a transition metal of a Group IVa, Va, VI or VIII metal of the Periodic Table such as titanium atoms, halogen atoms, and an electron donor compound. This catalyst component can be prepared by contacting at least a magnesium compound, a transition metal compound such as a titanium compound, and electron donor compound with one another.

The magnesium compound includes magnesium halides, magnesium oxide, magnesium hydroxide, magnesium hydroxyhalides, magnesium alkoxides, Grignard reagents, and alkyl magnesium. They are exemplified by $MgCl_2$, $MgBr_2$, $MgO$, $Mg(OH)_2$, $Mg(OH)Cl$, $Mg(OCH_3)_2$, $Mg(OC_2H_5)_2$, $Mg(OC_4H_9)_2$, $Mg(OC_6H_5)_2$, $Mg(C_2H_5)Cl$, $Mg(C_4H_9)Br$, $Mg(C_2H_5)_2$, and $Mg(C_6H_{13})_2$.

The transition metal compound is preferably a titanium compound including trivalent and tetravalent titanium compounds such as $TiCl_4$, $TiBr_4$, $Ti(OC_2H_5)Cl_3$, $Ti(OC_4H_9)_2Cl_2$, $Ti(OC_4H_9)_4$, and $TiCl_3$.

The electron donor compound includes carboxylic acids, carboxylic esters, alcohols, ethers, ketones, amines, amides, nitriles, aldehydes, alcoholates, phosphoamides, thioethers, thioesters, and carbonic esters, and phosphorus, arsenic, and antimony compounds in which these atoms are bonded to an organic group through a carbon or oxygen atom.

Examples of carboxylic acids include acetic acid, butyric acid, benzoic acid, p-methylbenzoic acid, and p-methoxybenzoic acid, and anhydrides thereof. Examples of carboxylic esters include ethyl acetate, butyl acetate, ethyl butyrate, methyl methacrylate, diethyl maleate, ethyl cyclohexanecarbonate, methyl benzoate, ethyl benzoate, ethyl p-methoxybenzoate, methyl p- methylbenzoate, ethyl p-tert-butylbenzoate, dibutyl phthalate, diallyl phthalate, and ethyl alpha-naphthoate.

Examples of the alcohols include methanol, ethanol, butanol, hexanol, octanol, cyclohexanol, benzyl alcohol, and allyl alcohol. Examples of the ethers include diethyl ether, diisopropyl ether, dibutyl ether, di-2-ethylhexyl ether, diallyl ether, diphenyl ether, and anisole. Examples of the ketones include acetone, methyl ethyl ketone, cyclohexanone, and benzophenone. They are not limitative.

The catalyst component comprises a transition metal compound such as titanium trichloride. Preferably the catalyst comprises magnesium.

The catalyst component used in this invention can be prepared by any known process. Typically, the Mg containing transition metal catalyst are produced by merely contacting the magnesium compound, titanium compound, and electron donor compound with one another. In the case where neither magnesium compound nor titanium compound contains halogen atoms, it is necessary to add a halogenating agent at any time in the above-mentioned contacting process. Examples of the halogenating agent include halogen atoms such as chlorine and bromine, hydrogen halides such as HCl and HBr, halogenated methane such as $CCl_4$ and $CHCl_3$, oxyhalides and halides of non-metal element such as $SO_2Cl_2$, $SOCl_2$, NOCl, $COCl_2$, $POCl_3$, $PCl_3$, and $PCl_5$, and metal halides such as $AlCl_3$, $ZnCl_3$, and $SiCl_4$.

The examples of processes for preparing the catalyst component are described in the following:

A process in which a combined product of titanium compound and electron donor compound is contacted with a magnesium halide. (Japanese Patent Publication No. 39431/1977)

A process in which a magnesium halide, organopolysiloxane, organic acid ester, and titanium compound are contacted with one another. (Japanese Patent Laid-open No. 20297/1976)

A process in which a magnesium halide, tetravalent titanium halide, organic acid ester, and organohalogen compound are contacted with one another. (Japanese Patent Laid-open No. 135690/1979)

A process in which a magnesium halide, titanium halide, and halogen compound are contacted with one another, and the resulting contact product is contacted with a mixture of organoaluminum compound and electron donor compound. (Japanese Patent Laid-open No. 18606/1981)

A process in which a metallic magnesium, halogenated hydrocarbon, and alkoxy group-containing organic compound are contacted with one another, and the resulting contact product is contacted with a titanium compound and electron donor compound. (Japanese Patent Laid-open No. 34707/1981)

A process in which a magnesium halide, electron donor compound, aromatic carboxylic acid or derivative thereof, organoaluminum compound, and titanium compound are contacted with one another. (Japanese Patent Laid-open No. 70104/1982)

A process in which a magnesium alkoxide is contacted with a silicon compound having the hydrogen-silicon bond, and the resulting contact product is contacted with an electron donor compound and titanium compound. (U.S. patent application Ser. No. 481,197, abandoned Dec. 7, 1984, filed by the present inventors)

The catalyst component may be mixed with an inorganic solid such as silica, alumina, silica-alumina, and zeolite, or with a solid aromatic hydrocarbon such as durene, anthracene, naphthalene, and diphenyl, or with a polymer such as polyethylene, polypropylene, and polystyrene, which does not adversely affect the polymerization of olefins. These substances may be used when the catalyst is prepared.

COCATALYST

The above-mentioned catalyst component is combined with a cocatalyst composed of (1) an organoaluminum compound represented by the formula $R^1R^2R^3Al$ wherein $R^1$, $R^2$, and $R^3$ are as defined above [referred to as component (b) hereinafter], (2) an organoaluminum halide represented by the formula $R^4{}_{3-n}AlX_n$ wherein $R^4$, X, and n are as defined above [referred to as component (c) hereinafter], (3) an electron donor compound containing a nitrogen atom, sulfur atom, oxygen atom, or phosphorus atom [referred to as component (d) hereinafter], and (4) an aromatic ester compound [referred to as component (e) hereinafter]. These four components are described below.

Examples of the organoaluminum compound, component (b), include trimethyl aluminum, triethyl aluminum, tripropyl aluminum, tributyl aluminum, triisobutyl aluminum, triisopentyl aluminum, trihexyl aluminum, tridecyl aluminum, triisoprenyl aluminum, triphenyl aluminum, tribenzyl aluminum, dimethyl aluminum hydride, diethyl aluminum hydride, diisobutyl aluminum hydride, diethyl aluminum methoxide, diethyl aluminum ethoxide, diethyl aluminum butoxide, diisobutyl aluminum ethoxide, diisobutyl aluminum butoxide, and diisobutyl aluminum phenoxide. In addition to the above compounds, alumoxanes such as methyl alumoxane, ethyl alumoxane, and isobutyl alumoxane may be used. The preferred organoaluminum compounds are the $C_{1-8}$ aluminum trialkyls and particularly triethyl aluminum and triisobutyl aluminum.

Examples of the organoaluminum halides, component (c), include methyl aluminum dichloride, ethyl aluminum dichloride, butyl aluminum dichloride, isobutyl aluminum dichloride, dimethyl aluminum chloride, diethyl aluminum chloride, dibutyl aluminum chloride, diisobutyl aluminum chloride, ethyl aluminum sesquichloride, diethoxy aluminum chloride, ethoxy aluminum dichloride, ethyl aluminum dibromide, diethyl aluminum bromide, ethyl aluminum sesquibromide, aluminum trichloride, and aluminum tribromide. Preferred organoaluminum halides include diethylaluminum chloride and ethylaluminum dichloride.

Examples of the electron donor compound, component (d), include the following.

Compounds containing a nitrogen atom:

2,2,6,6-tetramethylpiperidine, 2,6-dimethylpiperidine, 2,6-diethylpiperidine, 2,6-diisopropylpiperidine, 2,2,5,5-tetramethylpyrrolidine, 2,5-dimethylpyrrolidine, 2,5-diethylpyrrolidine, 2,5-diisopropylpyrrolidine, 2-methylpyridine, 3-methylpyridine, 4-methylpyridine, 1,2,4-trimethylpiperidine, 2,5-dimethylpiperidine, methyl nicotinate, ethyl nicotinate, nicotinamide, benzoic amide, 2-methylpyrrole, 2,5-dimethylpyrrole, imidazole, toluylic amide, benzonitrile, acetonitrile, aniline, paratoluidine, orthotoluidine, methatoluidine, triethylamine, diethylamine, dibutylamine, tetramethylenediamine, and tributylamine.

Compounds containing a sulfur atom:

Thiophenol, thiophene, ethyl 2-thiophenecarboxylate, ethyl 3-thiophenecarboxylate, 2-methylthiophene, methylmercaptan, ethylmercaptan, isopropylmercaptan, butyl mercaptan, diethyl thioether, diphenyl thioether, methyl benzenesulfonate, methylsulfite, and ethylsulfite.

Compounds containing an oxygen atom:

Tetrahydrofuran, 2-methyltetrahydrofuran, 3-methyltetrahydrofuran, 2-methyltetrahydrofuran, dioxane, dimethyl ether, diethyl ether, dibutyl ether, diisoamyl ether, diphenyl ether, anisole, acetophenone, acetone, methyl ethyl ketone, acetyl acetone, ethyl 2-furalate, isoamyl 2-furalate, methyl 2-furalate, and propyl 2-furalate.

Compounds containing a phosphorus atom:

Triphenyl phosphine, tributyl phosphine, triphenyl phosphite, tribenzyl phosphite, diethyl phosphate, and diphenyl phosphate.

The preferred electron donors contain the N atom such as 2,2,6,6-tetramethylpiperidine.

Examples of the aromatic ester compound, component (e), include methyl benzoate, ethyl benzoate, propyl benzoate, isobutyl benzoate, methyl p-toluate, ethyl p-toluate, propyl p-toluate, isobutyl p-toluate, methyl p-anisate, ethyl p-anisate, propyl p-anisate, isobutyl p-anisate, dimethyl phthalate, diethyl phthalate, diisobutyl phthalate, methyl alpha-naphthoate, and ethyl alpha-naphthoate. Especially preferred is methyl p-toluate and n-anisate.

The components (b), (c), (d), and (e) are used in the ratios shown below.

The molar ratio of component (b) to component (c) is 90:10 to 30:70, and preferably 80:20 to 50:50. If the quantity of component (c) is less than this range, the resulting polymer is poor in stereoregularity, particularly in the case where polymerization takes a long time, and the catalytic activity is lost with time. If the quantity of component (c) is greater than this range, the catalytic activity greatly decreases.

The molar ratio of component (d) to component (e) is 5:95 to 70:30, and preferably 10:90 to 60:40. If the quantity of component (d) is less than this range, no effect is made in the improvement of catalytic activity and the ability of catalyst to exhibit stereoregularity. If the quantity of component (d) is greater than this range, the catalytic activity is low and the resulting polymer is poor in stereoregularity.

The molar ratio of component (b) plus component (c) to component (d) plus component (e) is 50:50 to 85:15, and preferably 60:40 to 80:20. If the quantities of components (b) and (c) are less than this range, the catalytic activity is very low; and if the quantities of components (b) and (c) are greater than this range, the resulting polymer is very poor in stereoregularity.

Good results are obtained when the four components are used in the specific ratios as mentioned above.

PROCESS FOR POLYMERIZATION OF OLEFINS

According to this invention, an olefin is homopolymerized or copolymerized with the other olefin in the presence of a catalyst composed of the above-mentioned catalyst component and cocatalyst.

The olefin used in this invention includes ethylene and other alpha-olefins such as propylene, 1-butene, 4-methyl-1-pentene, 1-hexene, and 1-octene. The process of this invention is useful particularly for homopolymerization of alpha-olefins having 3 to 6 carbon atoms and for copolymerization of such alpha-olefins with one another and/or random or block copolymerization of such alpha-olefins with ethylene.

The catalyst component and cocatalyst are used in such a ratio that the organoaluminum compounds [components (b) and (c)] in the cocatalyst are in the range 1 to 2000 gram mol, particularly 20 to 500 gram mol, for 1 gram atom of titanium in the catalyst component.

The polymerization reaction may be carried out either in gas phase or liquid phase. The liquid-phase polymerization may be accomplished in an inert hydrocarbon such as n-butane, isobutane, n-pentane, isopentane, hexane, heptane, octane, cyclohexane, benzene, toluene, and xylene, or in the liquid monomer. The polymerization temperature is usually $-80°$ C. to $+150°$ C., preferably 40° C. to 120° C. The polymerization pressure is 1 to 60 atmospheres. The molecular weight modification of the resulting polymer is accomplished by introducing hydrogen or other known molecular weight modifiers. In the copolymerization of olefins, the quantity of other olefins to be copolymerized is usually less than 30 wt%, particularly 0.3 to 15 wt%, based on the olefin. The polymerization may be performed continuously or batchwise under the commonly used conditions. The copolymerization may be accomplished in one step or in two or more steps.

The catalyst used in this invention which is composed of a new cocatalyst and catalyst component has a high catalytic activity, and the process of this invention provides polymers having a high stereoregularity. When applied to the block copolymerization of olefins in gas phase, the process of this invention performs the copolymerization at an extremely high rate. Thus it makes it possible to produce block copolymers with a high content of comonomers.

The invention is described in more detail with reference to the following examples. The scope of this invention is not limited by them. Percent (%) in the examples means wt%, unless otherwise indicated.

EXAMPLE 1

Preparation of Catalyst Component

Into a 500-ml glass reactor were charged 30.2 g of magnesium diethoxide and 100 ml of n-heptane. With stirring at room temperature, a mixture of 75 g of trichlorosilane and 30 ml of n-heptane was added dropwise, followed by stirring at 70° C. for 2 hours. The resulting solid was filtered off at 70° C. and washed 5 times with 300 ml portions of n-hexane at 65° C., followed by drying at 60° C. for 30 minutes under reduced pressure. Thus there was obtained solid component (I).

Into a 300-ml stainless steel mill pot containing 100 pieces of stainless steel balls, 12 mm in diameter, were charged 15.6 g of solid component (I) and 3.8 g of ethyl benzoate, followed by crushing for 1 hour. Thus there was obtained solid component (II).

Into a 200-ml glass reactor were charged 8.5 g of solid component (II), 40 ml of toluene, and 60 ml of titanium tetrachloride, followed by stirring at 90° C. for 2 hours. The resulting solid was filtered off at 90° C. and washed 7 times with 100 ml portions of n-hexane at 65° C., followed by drying at 60° C. for 30 minutes under reduced pressure. Thus there was obtained solid catalyst component (A) which contains magnesium, titanium, chlorine, and ethyl benzoate. The content of titanium was 2.5%.

Polymerization of Propylene

Into a 3-liter autoclave which had been completely dried, with the atmosphere replaced with nitrogen, was charged 21.5 mg of the above-mentioned solid catalyst component (A). On the other hand, to a glass test tube which had been completely dried, with the atmosphere replaced with nitrogen, were added 2.4 ml of n-heptane solution containing 1 mol of triethyl aluminum (referred to as TEAL hereinafter) in 1 liter of n-heptane and 0.8 ml of n-heptane solution containing 1 mol of diethyl aluminum chloride (referred to as DEAC hereinafter) in 1 liter of n-heptane. To the test tube were further added 1.8 ml of n-heptane solution containing 0.5 mol of methyl p-toluate (referred to as MPT hereinafter) in 1 liter of n-heptane and 1.6 ml of n-heptane solution containing 0.5 mol of 2,2,6,6-tetramethylpiperidine (referred to as TMPIP hereinafter) in 1 liter of n-heptane. The test tube was allowed to stand for 5 minutes. All of the mixture solution (cocatalyst solution) was introduced into the autoclave by using a syringe.

Then, 1.5 liters of hydrogen and 2 liters of liquefied propylene were forced into the autoclave. The reaction system was heated to 70° C. and the polymerization of propylene was carried out for 1 hour. When the polymerization was complete, unreacted propylene was purged and the polymerization product was dried at 60° C. under reduced pressure. Thus there was obtained 436.0 g of white polypropylene powder having an HI of 96.5% (heptane insolubles which remain undissolved when extracted with boiling n-heptane for 5 hours), a bulk density of 0.41 g/cc, and an MFR of 2.0 g/10 min. (melt flow rate as measured according to ASTM D1238). The quantity of polypropylene formed per 1 g of catalyst component (A) was 20.3 kg, and the quantity of polypropylene formed per 1 g of titanium in catalyst component (A) was 810 kg.

EXAMPLES 2 TO 6

Cocatalyst solutions were prepared in the same way as in Example 1 from the four components in quantities as shown in Table 1. Using the cocatalyst solutions, the polymerization of propylene was carried out in the same way as in Example 1. The results are shown in Table 1.

COMPARATIVE EXAMPLES 1 TO 5

Cocatalyst solutions were prepared in the same way as in Example 1, except that any one of the four components was not used. Using the cocatalyst solutions, the polymerization of propylene was carried out in the same way as in Example 1. The results are shown in Table 1.

TABLE 1

| | Component b TEAL (mmol) | Component c DEAC (mmol) | Component d TMPIP (mmol) | Component e MPT (mmol) | Efficiency of catalyst (kg/g-cat.) | (kg/g-Ti) | HI (%) |
|---|---|---|---|---|---|---|---|
| Example | | | | | | | |
| 1 | 2.4 | 0.8 | 0.8 | 0.8 | 20.3 | 810 | 96.5 |
| 2 | 2.4 | 0.8 | 0.53 | 0.53 | 32.7 | 1310 | 95.1 |
| 3 | 2.0 | 1.0 | 0.75 | 0.75 | 25.2 | 1010 | 95.8 |
| 4 | 1.6 | 1.6 | 0.53 | 0.53 | 22.1 | 880 | 95.7 |
| 5 | 2.4 | 0.8 | 0.4 | 1.2 | 16.2 | 650 | 96.8 |
| 6 | 2.4 | 0.8 | 0.27 | 0.8 | 18.4 | 740 | 96.2 |
| Comparative Example | | | | | | | |
| 1 | 2.4 | — | — | 0.8 | 12.0 | 480 | 94.8 |
| 2 | 2.4 | — | 0.8 | — | 20.3 | 810 | 76.6 |
| 3 | 2.4 | 0.8 | — | 0.8 | 20.7 | 830 | 93.2 |
| 4 | 2.4 | — | 0.4 | 0.4 | 29.5 | 1180 | 88.0 |
| 5 | — | 0.4 | 0.4 | 0.4 | 7.1 | 280 | 88.5 |

EXAMPLES 7 AND 8

The polymerization of propylene was carried out in the same way as in Example 1, except that DEAC as component (c) was replaced by ethyl aluminum dichloride (referred to as EADC hereinafter). The results are shown in Table 2.

TABLE 2

| Example | Component b TEAL (mmol) | Component c EADC (mmol) | Component d TMPIP (mmol) | Component e MPT (mmol) | Efficiency of catalyst (kg/g-cat.) | (kg/g-Ti) | HI (%) |
|---|---|---|---|---|---|---|---|
| 7 | 2.4 | 0.8 | 0.8 | 0.8 | 14.3 | 570 | 97.4 |
| 8 | 2.4 | 0.8 | 0.53 | 0.53 | 18.4 | 740 | 96.7 |

EXAMPLES 9 AND 10

The polymerization of propylene was carried out in the same way as in Example 1 or Example 5, except that TEAL as component (b) was replaced by triisobutyl aluminum (referred to as TIBAL hereinafter) and MPT as component (e) was replaced by ethyl p-anisate (referred to as EPA hereinafter). The results are shown in Table 3.

COMPARATIVE EXAMPLES 6 AND 7

The polymerization reaction was carried out in the same way as in Example 9, except that components (c) and (d) were not used and component (e) was replaced by methyl methacrylate (referred to as MMA hereinafter). The results are shown in Table 3.

TABLE 3

|  | Component b TIBAL (mmol) | Component c DEAC (mmol) | Component d TMPIP (mmol) | Component e MPT (mmol) | Efficiency of catalyst (kg/g-cat.) | (kg/g-Ti) | HI (%) |
| --- | --- | --- | --- | --- | --- | --- | --- |
| Example |  |  |  |  |  |  |  |
| 9 | 2.4 | 0.8 | 0.8 | 0.8 | 31.0 | 1240 | 95.1 |
| 10 | 2.4 | 0.8 | 0.4 | 1.2 | 23.2 | 928 | 96.3 |
| Comparative Example |  |  |  |  |  |  |  |
| 6 | 2.4 | — | — | 0.8 | 14.5 | 580 | 94.6 |
| 7 | 2.4 | 0.8 | 0.8 | 0.8 (MMA) | 6.6 | 260 | 75.5 |

EXAMPLE 11

Preparation of Catalyst Component

Into a 300-ml stainless steel mill pot containing 100 pieces of stainless steel balls, 12 mm in diameter, were charged 22.3 g of anhydrous magnesium chloride, 5.5 g of ethyl benzoate, and 4.5 ml of methyl polysiloxane (viscosity 100 cs. at 25° C.), followed by crushing for 15 hours. Thus there was obtained solid component (III).

Into a 500-ml glass reactor were charged 11.3 g of solid component (III), 30 ml of n-heptane, and 150 ml of titanium tetrachloride, followed by stirring at 100° C. for 1 hour. The resulting solid substance was separated by decantation and washed 7 times with 100 ml portions of n-hexane at 65° C., followed by drying at 50° C. for 1 hour under reduced pressure. Thus there was obtained solid catalyst component (B) which contains magnesium, titanium, chlorine, and ethyl benzoate. The content of titanium was 2.5%.

Polymerization of Propylene

The polymerization of propylene was carried out in the same way as in Example 1, except that the catalyst component (B) obtained in the above-mentioned step was used. Thus there was obtained polypropylene having an HI of 95.1%. The quantity of polypropylene formed per 1 g of catalyst component (B) was 13.4 kg, and the quantity of polypropylene formed per 1 g of titanium in catalyst component (B) was 540 kg.

COMPARATIVE EXAMPLES 8 AND 9

The polymerization reaction was carried out in the same way as in Example 11, except that components (c) and (d) were not used or component (c) was not used. The results are shown in Table 4.

TABLE 4

|  | Component b TEAL (mmol) | Component c DEAC (mmol) | Component d TMPIP (mmol) | Component e MPT (mmol) | Efficiency of catalyst (kg/g-cat.) | (kg/g-Ti) | HI (%) |
| --- | --- | --- | --- | --- | --- | --- | --- |
| Example |  |  |  |  |  |  |  |
| 11 | 2.4 | 0.8 | 0.8 | 0.8 | 13.4 | 540 | 95.1 |
| Comparative Example |  |  |  |  |  |  |  |
| 8 | 2.4 | — | — | 0.8 | 11.7 | 470 | 93.9 |
| 9 | 2.4 | — | 0.4 | 0.4 | 18.5 | 740 | 86.0 |

EXAMPLES 12 TO 15

The polymerization of propylene was carried out in the same way as in Example 6, except that TMPIP as component (d) was replaced by those compounds shown in Table 5. The results are shown in Table 5.

COMPARATIVE EXAMPLE 10

The polymerization of propylene was carried out in the same way as in Example 12, except that DEAC as component (c) was not used. The results are shown in Table 5.

TABLE 5

|  | Component (d) | Efficiency of Catalyst (kg/g-cat.) | (kg/g-Ti) | HI (%) |
| --- | --- | --- | --- | --- |
| Example |  |  |  |  |
| 12 | Ethyl thiophene-carboxylate | 13.6 | 540 | 97.0 |
| 13 | 2-Methylpyridine | 16.2 | 650 | 97.6 |
| 14 | Tetrahydrofuran | 13.8 | 550 | 96.8 |
| 15 | Triphenylphosphite | 13.4 | 540 | 96.3 |
| Comparative Example |  |  |  |  |
| 10 | Ethyl thiophene-carboxylate | 13.0 | 520 | 91.2 |

EXAMPLE 16

Preparation of Catalyst Component

Into a 300-ml stainless steel mill pot containing 100 pieces of stainless steel balls, 10 mm in diameter, were charged 28.7 g of anhydrous magnesium chloride and 7.7 g of complex of titanium tetrachloride and ethyl benzoate under the nitrogen atmosphere. The mill pot was placed on a shaker and crushing was performed for 20 hours. Thus there was obtained a solid component containing 2.2% of titanium. In a 300-ml glass container were placed 15.2 g of this solid component and 50 ml of n-heptane under the nitrogen atmosphere, followed by stirring at 90° C. for 2 hours. The solid component was filtered off at 65° C. and washed 4 times with 60 ml portions of n-heptane, followed by drying. Thus there was obtained solid catalyst component (C) containing 1.4% of titanium.

Polymerization of Propylene

The polymerization of propylene was carried out in the same way as in Example 1, except that the catalyst component (C) was used. Thus there was obtained polypropylene having an HI of 95.5%. The quantity of polypropylene formed per 1 g of catalyst component (C) was 5.3 kg, and the quantity of polypropylene formed per 1 g of titanium in catalyst component (C) was 380 kg.

EXAMPLES 17 TO 20

The polymerization of propylene was carried out in the same way as in Example 16, except that component (b) (TEAL), component (c) (DEAC), component (d) (TMPIP), and component (e) (MPT) were used in amounts as shown in Table 6. The results are shown in Table 6.

COMPARATIVE EXAMPLES 11 AND 12

The polymerization of propylene was carried out in the same way as in Example 16, except that components (c) and (d) were not used or component (c) was not used. The results are shown in Table 6.

TABLE 6

| | Component b TEAL (mmol) | Component c DEAC (mmol) | Component d TMPIP (mmol) | Component e MPT (mmol) | Efficiency of catalyst (kg/g-cat.) | (kg/g-Ti) | HI (%) |
|---|---|---|---|---|---|---|---|
| Example | | | | | | | |
| 17 | 2.4 | 0.8 | 0.53 | 0.53 | 7.4 | 530 | 94.5 |
| 18 | 2.0 | 1.0 | 0.75 | 0.75 | 5.9 | 420 | 95.1 |
| 19 | 1.6 | 1.6 | 0.4 | 1.2 | 4.2 | 300 | 95.8 |
| 20 | 2.4 | 0.8 | 0.27 | 0.8 | 4.3 | 310 | 95.6 |
| Comparative Example | | | | | | | |
| 11 | 2.4 | — | — | 0.8 | 3.7 | 260 | 94.0 |
| 12 | 2.4 | — | 0.4 | 0.4 | 7.2 | 510 | 86.4 |

EXAMPLE 21

The polymerization of propylene was carried out in the same way as in Example 20, except that TMPIP was replaced by 2-methylpyridine. Thus there was obtained polypropylene having an HI of 96%. The quantity of polymer formed per 1 g of catalyst component (C) was 3.8 kg, and the quantity of polymer formed per 1 g of titanium in catalyst component (C) was 270 kg.

EXAMPLE 22

The homopolymerization of propylene was carried out in the same was as in Example 2, except that the polymerization time was 30 minutes and 13.5 mg of catalyst component (A) was used. Unreacted propylene and hydrogen were purged from the autoclave and the atmosphere in the autoclave was replaced with nitrogen. With stirring of the propylene homopolymer, a mixture gas of ethylene and propylene (1.5:1 in molar ratio) was introduced into the autoclave. Copolymerization was carried out for 3 hours while making adjustment so that the polymerization system was kept at 70° C. and the partial pressure of the mixture gas was kept at 3 kg/cm².

After the copolymerization was complete, unreacted ethylene and propylene were purged from the autoclave. Thus there was obtained 397 g of propylene-ethylene block copolymer. The portion of the block copolymer was 16.8%, which was calculated from the consumption of the mixture gas and the quantity of the polymer formed. The content of ethylene was 8.2%, which was determined by infrared spectrometry. The quantity of homopolymer formed per 1 g of catalyst component (A) was 24.5 kg, and the quantity of copolymer formed was 4.9 kg.

COMPARATIVE EXAMPLE 13

Copolymerization was carried out in the same way as in Example 22, except that component (c) (DEAC) and component (d) (TMPIP) were not used. The yield of propylene-ethylene copolymer was 204 g. The portion of copolymer was 8.9% and the content of ethylene was 4.1%. The quantity of homopolymer formed per 1 g of catalyst component (A) was 13.8 kg, and the quantity of copolymer formed was 1.3 kg.

The results of Example 22 and Comparative Example 13 indicate that the process of this invention greatly speeds up the rate of copolymerization and forms copolymers having the copolymer portion in large quantities.

What is claimed is:

1. A cocatalyst comprising:
   a. an organoaluminum compound represented by the formula $R^1R^2R^3Al$ wherein $R^1$, $R^2$ and $R^3$, which may be the same or different, each denotes a $C_1$–$C_{20}$ alkyl, alkenyl, cycloalkyl, aryl, aralkyl, or alkoxy group, or a hydrogen atom,
   b. an organoaluminum halide represented by the formula $R^4{}_{3-n}AlX_n$ wherein $R^4$ denotes a $C_1$–$C_{20}$ alkyl, alkenyl, cycloalkyl, aryl, aralkyl or alkoxy group, X denotes a halogen atom and n is equal to or greater than 1,
   c. an electron donor compound containing a nitrogen atom, sulfur atom, oxygen atom or phosphorous atom, and
   d. an aromatic carboxylic acid ester, wherein the molar ratio of component a. to b. is in the range of 90:10 to 30:70, the molar ratio of component c. to d. is in the range of 5:95 to 70:30 and the molar ratio of component a.+b. to component c.+d. is in the range of 50:50 to 85:15.

2. The cocatalyst of claim 1 wherein the organoaluminum compound is a trialkyl aluminum.

3. The cocatalyst of claim 2 wherein the organoaluminum compound is selected from triethyl aluminum and triisobutyl aluminum and the organoaluminum halide is selected from diethylaluminum chloride and ethylaluminum dichloride.

4. The cocatalyst of claim 3 wherein the electron donor compound contains a nitrogen atom.

5. The cocatalyst of claim 4 wherein the aromatic ester is selected from methyl p-toluate or ethyl p-anisate and the nitrogen containing compound is 2,2,6,6-tetramethylpiperidine.

6. The cocatalyst of claim 1 comprising triethyl aluminum, diethyl aluminum chloride, methyl p-toluate and 2,2,6,6-tetramethylpiperidine.

7. A catalyst system for the homopolymerization or copolymerization of olefins comprising:
   (A) a solid titanium containing catalyst component comprising magnesium atoms, titanium atoms, halogen atoms and an electron donor compound, and
   (B) the cocatalyst of claim 1.

8. A catalyst system for the homopolymerization or copolymerization of olefins comprising:
   a. a solid titanium containing catalyst component comprising magnesium atoms, titanium atoms, halogen atoms and an electron donor compound; and
   b. the cocatalyst of claim 2.

9. A catalyst system for the homopolymerization or copolymerization of olefins comprising:
   a. a solid titanium containing catalyst component comprising magnesium atoms, titanium atoms, halogen atoms and an electron donor compound; and
   b. the cocatalyst of claim 3.

10. A catalyst system for the homopolymerization or copolymerization of olefins comprising:
    a. a solid titanium containing catalyst component comprising magnesium atoms, titanium atoms, halogen atoms and an electron donor compound; and
    b. the cocatalyst of claim 4.

11. A catalyst system for the homopolymerization or copolymerization of olefins comprising:
    a. a solid titanium containing catalyst component comprising magnesium atoms, titanium atoms, halogen atoms and an electron donor compound; and
    b. the cocatalyst of claim 5.

12. A catalyst system for the homopolymerization or copolymerization of olefins comprising:
    a. a solid titanium containing catalyst component comprising magnesium atoms, titanium atoms, halogen atoms and an electron donor compound; and
    b. the cocatalyst of claim 6.

13. A cocatalyst comprising:
    a. an organoaluminum compound represented by the formula $R^1R^2R^3Al$ wherein $R^1$, $R^2$ and $R^3$, which may be the same or different, each denotes a $C_1$–$C_{20}$ alkyl, alkenyl, cycloalkyl, aryl, aralkyl or alkoxy group or a hydrogen atom;
    b. an organoaluminum halide represented by the formula $R^4{}_{3-n}AlX_n$ wherein $R^4$ denotes a $C_1$–$C_{20}$ alkyl, alkenyl, cycloalkyl, aryl, aralkyl or alkoxy group, X denotes a halogen atom and n is equal to or greater than 1;
    c. an electron donor compound containing a nitrogen atom, and
    d. an aromatic carboxylic acid ester, wherein the molar ratio of component a. to b. is in the range of 90:10 to 30:70, the molar ratio of component c. to d. is in the range of 5:95 to 70:30 and the molar ratio of component a.+b. to component c.+d. is in the range of 50:50 to 85:15.

14. The cocatalyst of claim 13 wherein the organoaluminum compound is a trialkyl aluminum and the organoaluminum halide is selected from diethyl aluminum chloride and ethylaluminum dichloride.

15. The cocatalyst of claim 13 wherein the aromatic carboxylic acid ester is selected from methyl p-toluate or ethyl p-anisate and the nitrogen containing compound is 2,2,6,6-tetramethylpiperdine.

16. The cocatalyst of claim 13 comprising triethylaluminum, diethylaluminum chloride, methyl-p-toluate and 2,2,6,6-tetramethylpiperidine.

17. A catalyst system for the homopolymerization or copolymerization of olefins comprising:
    a. a solid titanium containing catalyst component comprising magnesium atoms, titanium atoms, halogen atoms and an electron donor compound, and
    b. the cocatalyst of claim 13.

18. A catalyst system for the homopolymerization or copolymerization of olefins comprising:
    a. a solid titanium containing catalyst component comprising magnesium atoms, titanium atoms, halogen atoms and an electron donor compound, and
    b. the cocatalyst of claim 14.

19. A catalyst system for the homopolymerization or copolymerization of olefins comprising:
    a. a solid titanium containing catalyst component comprising magnesium atoms, titanium atoms, halogen atoms and an electron donor compound, and
    b. the cocatalyst of claim 15.

20. A catalyst system for the homopolymerization or copolymerization of olefins comprising:
    a. a solid titanium containing catalyst component comprising magnesium atoms, titanium atoms, halogen atoms and an electron donor compound, and
    b. the cocatalyst of claim 16.

21. A cocatalyst comprising:
    a. a trialkyl aluminum compound wherein the alkyl groups can have from 1–20 carbon atoms;
    b. one diethyl aluminum chloride or ethyl aluminum dichloride;
    c. 2,2,6,6-tetramethylpiperidine; and
    d. one of methyl-p-toluate or ethyl-p-amisate;
    wherein the molar ratio of component a. to b. is in the range of 90:10 to 30:70, the molar ratio of component c. to d. is in the range of 5:95 to 70:30 and the molar ratio of component a.+b. to component c.+d. is in the range of 50:50 to 85:15.

22. The cocatalyst of claim 1 wherein the electron donor is selected from 2,2,6,6-tetramethylpiperidine, 2,6-dimethylpiperidine, 2,6-diethylpiperidine, 2,6-diisopropylpiperidine, 2,2,5,5-tetramethylpyrrolidine, 2,5-dimethylpyrrolidine, 2,5-diethylpyrrolidine, 2,5-diisopropylpyrrolidine, 2-methylpyridine, 3-methylpyridine, 4-methylpyridine, 1,2,4-trimethylpiperidine, 2,5-dimethylpiperidine, methyl nicotinate, ethyl nicotinate, nicotinamide, benzoic amide, 2-methylpyrrole, 2,5-dimethylpyrrole, imidazole, toluylic amide, benzonitrile, acetonitrile, aniline, paratoluidine, orthotoluidine, methatoluidine, triethylamine, diethylamine, dibutylamine, tetramethylenediamine, tributylamine, thiophenol, thiophene, ethyl 2-thiophenecarboxylate, ethyl 3-thiophenecarboxylate, 2-methylthiophene, methylmercaptan, ethylmercaptan, isopropylmercaptan, butyl mercaptan, diethyl thioether, diphenyl thioether, methyl benzesulfonate, methylsulfite, ethylsulfite, tetrahydrofuran, 2-methyltetrahydrofuran, 3-methyltetrahydrofuran, dioxane, dimethyl ether, diethyl ether, dibutyl ether, diisoamyl ether, diphenyl ether, anisole, acetophenone, acetone, methyl ethyl ketone, acetyl acetone, ethyl 2-furalate, isoamyl 2-furalate, methyl 2-furalate, propyl 2-furalate, triphenyl phosphine, tributyl phosphine, triphenyl phosphite, tribenzyl phosphite, diethyl phosphate or diphenyl phosphate.

23. The cocatalyst of claim 22 wherein the electron donor compound is selected from 2,2,6,6-tetramethylpiperidine or 2-methylpyridine.

24. The cocatalyst of claim 13 wherein said electron donor compound is selected from 2,2,6,6-tetramethylpiperidine, 2,6-dimethylpiperidine, 2,6-diethylpiperidine, 2,6-diisopropylpiperidine, 2,2,5,5-tetramethylpyrrolidine, 2,5-dimethylpyrrolidine, 2,5-diethylpyrrolidine, 2,5-diisopropylpyrrolidine, 2-methylpyridine, 3-methylpyridine, 4-methylpyridine, 1,2,4-trimethylpiperidine, 2,5-dimethylpiperidine, methyl nicotinate, ethyl nicotinate, nicotinamide, benzoic amide, 2-methylpyrrole, 2,5-dimethylpyrrole, imidazole, toluylic amide, benzonitrile, acetonitrile, aniline, paratoluidine, orthotoluidine, methatoluidine, triethylamine, diethylamine, dibutylamine, tetramethylenediamine, or tributylamine.

* * * * *